United States Patent Office 3,057,188
Patented Oct. 9, 1962

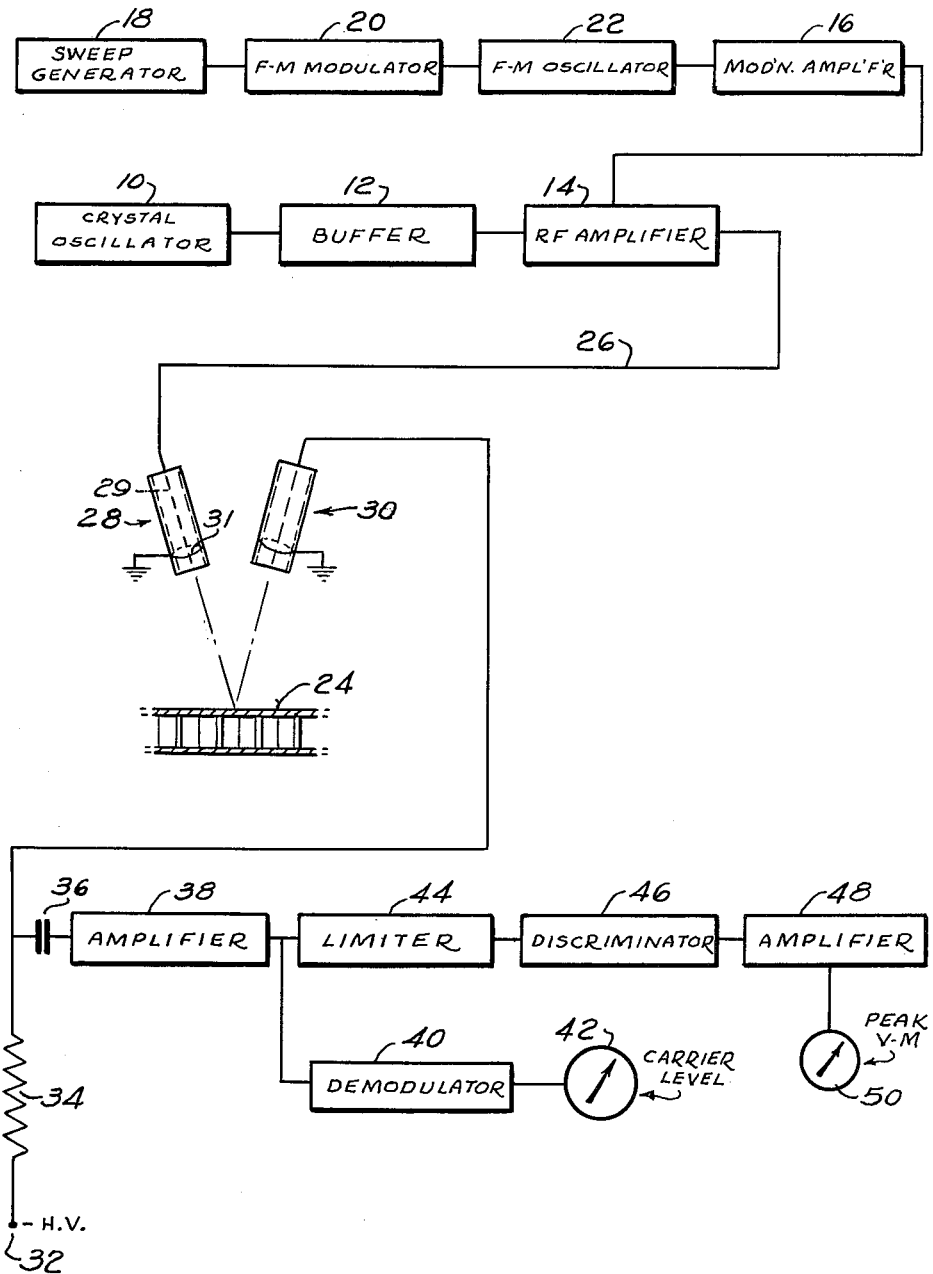

3,057,188
ULTRASONIC MECHANICAL IMPEDANCE
MEASURING DEVICE
Elliott A. Henry, Newtown, Conn., assignor to Sperry
Products, Inc., a corporation of New York
Filed Oct. 30, 1958, Ser. No. 770,777
5 Claims. (Cl. 73—67.1)

This invention pertains to measurement of the mechanical properties of materials in terms of their mechanical impedance and related parameters, especially with a view to the inspection and testing of specimens or workpieces having internal structure, without requiring the destructive testing of samples thereof. The invention has special application to the routine testing of large sheets of multi-ply or laminated materials, in which internal failures, as of the bonding agents and the like, may be very serious; however, as will appear, the invention is generally of wider application where information is needed which can be expressed in terms of the mechanical impedance of the structure, or related characteristics.

More particularly, the invention is directed to the nondestructive inspection of such laminated materials as are widely used in the airframe industry, such as adhesive-bonded laminates, adhesive-bonded or brazed honeycomb structures, and so on. The criterion of quality, in such materials, is the strength of the bond or the mechanical coupling between elements of the structure, and the quality factors relate both to the cohesion of the bonding agent and its adhesion to the other components of the structure. Low strength of bond may result from physical defects such as voids, porous glue lines, defective brazing and the like, or they may be chemical or physico-chemical, such as improper curing of adhesive materials.

In the past, the bond strengths of such materials have been determined by destructive tests made upon samples taken from each sheet fabricated, it being assumed that the sample is representative of the whole sheet. This assumption is, of course invalid. It has also been proposed to inspect for internal physical defects such as porous glue lines and voids, by the use of short acoustic impulses in echo-ranging type systems, as disclosed in my prior U.S. patent application Serial No. 665,773, filed June 14, 1957 and owned by the assignee of the present application. Such systems, however, cannot indicate or measure the strength of an adhesive bond or brazed connection, especially in the absence of physical defects or imperfections in the bond line. This is because the reflected energy in such tests comes from the individual components in accordance with their acoustic properties, and does not reveal any information as to the degree of, or even the absence of, mechanical coupling amongst the several parts or components.

It is accordingly a principal object of the present invention to provide a novel system and apparatus for the inspection and measurement of internal structures in terms of their mechanical impedances, which can be shown to depend upon the degree of mechanical coupling, and hence bonding, between the individual parts or components of the assemblies.

It is a further object of the invention to provide a system as described in which the stimulus applied to the workpiece, while acoustic in nature, is used to produce measurable effects depending entirely upon the mechanical impedance of a bonded or laminated assembly.

Another object of the invention is to provide a system as described, which is particularly useful where avoidance of physical or mechanical connection between the article under test, and the test equipment, is a desideratum, and also to such a system applicable in cases in which a single face of the article or assembly is available.

Still another object of the invention is to provide a novel system and apparatus for tests of the kind described above, using a modulated carrier scheme of compressional wave propagation and a special form of transducer, whereby the test indication is obtained without any loading or other error introduced by the presence of the measuring means itself. The use of a modulated carrier system also permits a direct and accurate utilization of the Doppler principle to obtain one of the test parameters indicative of the quality of the piece being tested.

Briefly, my invention depends upon the use of a gas plasma transducer, of a known kind, to introduce acoustic ultrasonic energy at one face of an article under test, the ultrasonic energy being initiated as a relatively lower-frequency modulation of a high frequency carrier, the factor of velocity of the force application which enters into the problem being directly measured by Doppler shift in the carrier wave energy itself, which thus serves a dual function in the procedure. A receiving transducer of a similar type is employed to detect reflected ultrasonic energy from the workpiece, and to indicate any variations, from point to point, of the mechanical impedance of the structure, as the transducers may be scanned over the surface thereof; the same transducer receives the frequency-shifted carrier wave energy for Doppler indication.

The invention will best be understood by referring now to the following detailed specification of a preferred and exemplary embodiment thereof, given by way of example, and taken in connection with the appended drawing, showing in schematic and block form one such arrangement.

The theory underlying the invention is based upon the fact that a change in the physical properties of any component of a mechanical structure, or in the mechanical coupling between the components, will be reflected as a change in the mechanical impedance of the structure. The degree of such change in the mechanical impedance will be a function both of the change in the property (or coupling) and in the location or disposition of the component. The mechanical strength of the structure is directly related to the mechanical impedance, as even a small physical change of a property or coupling will produce a sensible change in the mechanical impedance and in the strength of the structure.

The mechanical impedance of a structure, which is directly analogous to electrical impedance in a circuit or network, is given by:

$$Z = f/v$$

where $Z$ is the mechanical impedance in mechanical ohms, $f$ is the alternating force applied to the structure (analogous to applied voltage), and $v$ is the linear velocity in the direction of the force at the point of application. $Z$ will be a complex quantity except at the mechanical resonant frequency of the structure, at which frequency it will become purely resistive or dissipative.

It follows from the above that if the alternating force is held constant, the mechanical impedance $Z$, at resonance, is a function of $v$, the linear velocity in the direction of the force at the point of application, and there is an inverse relation between $Z$ and $v$. If the force is constant, $v$ will be inversely proportional to the stiffness of the structure, or directly proportional to its compliance, and the stiffness, for a composite structure, will be governed in part by the mechanical coupling between the components of the structure, and therefore by the shear strength.

Accordingly, the invention provides an apparatus for the application of a rapidly alternating mechanical (ultrasonic) force to a surface of the structure being examined, said alternating force having a constant magnitude and a frequency cyclically varied over a narrow range that encompasses the resonant frequency of the structure. The invention further provides for the measurement of the velocity of the displacement of the surface of the structure at the point of, and in the direction of, the applied alernating force.

Velocity information is obtained by using the well-known Doppler principle, according to which:

$$V = fc/2F$$

where V is the velocity being measured, F is the carrier frequency, $f$ is the Doppler frequency, and $c$ is the wave velocity in the medium. It is to be observed that while Doppler measurement of velocities is old and well-known, the present invention contemplates both the generation and measurement of the displacement velocity by the same wave. Ordinarily, wave Doppler methods are applied to the measurement of velocities arising from some other and outside cause, and a considerable simplification results in the present case in which the velocity as such is not of direct interest, but must be measured in order to arrive at a value for an entirely different parameter of the structure. In this case, a single wave of energy is used both to produce a mechanical displacement velocity of a surface of the object being tested, and its Doppler shift is used to indicate the magnitude of that velocity; since the force applied is held constant, the resulting velocity changes are attributable to the change in mechanical impedance as outlined above.

Referring now to the drawing, numeral 10 designates a crystal-controlled or other constant frequency electronic oscillator operating at a high (radio) frequency, for example of the order of ten megacycles per second. As in the case of a radio transmitter, the output of oscillator 10 is coupled through a buffer stage 12 (to prevent reactions on the constancy of the oscillator frequency) to a power amplifier 14. The voltage output of the power amplifier is high, for example of the order of fifteen thousand volts. The carrier wave output of amplifier 14 is amplitude modulated by a relatively lower-frequency, frequency modulated wave, obtained from the modulation amplifier 16. The frequency swing of the frequency modulation employed is established by a conventional recurrent sweep generator 18, producing for example a sawtooth or pyramidal wave having a low audio frequency such as 400 cycles per second. This wave is coupled to the frequency modulator stage 20, such as a reactance tube modulator or other known type, to cyclically vary the output frequency of the FM oscillator 22. The center frequency of the oscillator 22 is adjustable to encompass the nominal or expected resonant frequency of the workpiece 24 or other part undergoing test. A range of center or quiescent frequencies of from twenty to one hundred kilocycles per second will be found adequate to accommodate a wide range of test specimens.

In operation, the components just described provide a fixed carrier frequency voltage output on conductor 26, of say ten megacycles, at an output voltage of 15,000 volts, amplitude modulated to a fixed depth of approximately 60 percent by the varying frequency or frequency-modulated wave as described. As stated, the center frequency of the frequency modulated wave is adjustable, in the low radio frequency range (or the ultrasonic range), and its output is swept in a cyclical manner between the limits imposed by the low frequency of sweep generator 18. The net result is the amplitude modulation of the RF carrier by a wave which varies in a repetitious manner between limits closely spaced on opposite sides of a relatively low radio frequency, or ultrasonic frequency, established by oscillator 22.

In order to couple the desired acoustic wave energy to the surface of the specimen or workpiece undergoing test, without requiring physical contact therewith, and in a manner convenient for surface scanning from point to point, a so-called "plasma" transducer 28 is connected to the output conductor 26. Transducers of this type were formerly called spark-gap or corona transducers, and have been extensively described in the patent and other literature; for example, in U.S. Patent 1,687,011 issued October 9, 1928 to Fleischmann, and Patent 1,799,646 issued April 7, 1931 to Ruben. Basically, such transducers operate by the production of a gaseous plasma in air, or other medium, due to the high potential between two electrodes, in a manner fully equivalent to a corona or spark discharge. The composite wave energy output from the amplifier 14 is thus converted into acoustical energy as a result of the growth and decay mechanism of the plasma formed between electrodes 29, 31 of the transducer 28. Impingement of the acoustic wave energy on the specimen 24 thus causes it to vibrate at ultrasonic frequencies, and under a substantially constant amplitude applied force level. The velocity of the resulting displacements of the surface will, as already stated, depend upon the nature of the substructure, and specifically upon its internal mechanical impedance. This velocity level is measured by the means now to be described.

Use of a plasma transducer 30 as a receiver is somewhat less common than the transmitting transducer 28, but it is structurally identical and operates as follows. The acoustic wave energy plasma of transducer 28 produces an oscillating acoustic field of very high intensity, adjacent to the surface of specimen or workpiece 24 and the low frequency component of this excitation induces vibration of the area of the specimen which is a maximum when this component is equal to the natural resonant frequency of that area. The vibrating plasma of transducer 28 couples almost perfectly to the air because of the good impedance match (gas to gas). However, the carrier frequency (ten megacycles) being many orders of magnitude higher than the ultrasonic modulation frequency, will have no effect on the low frequency resonance. As a result of the almost 100 percent mismatch in impedance between the vibrating air and the specimen surface (gas to solid), practically no acoustic energy will be introduced into the interior of the specimen, differentiating the present invention sharply from known ultrasonic inspection techniques. However, this acoustic energy which is not transferred into the specimen is reflected from the specimen area undergoing inspection, and will at least in part pass into the gaseous medium (air) within the receiving transducer 30. The angle between the axes of the transducers is preferably kept small to insure that the instrument closely approximates the theory of the test; also, the angle between the transducer axes and the workpiece surface is as near a right angle as possible, and they are directed at the same spot of the surface.

In transducer 30, a plasma is formed which is due to the D.C. potential between the cathode and anode, and here again the potential involved may be of the order of 15,000 volts, supplied between the cathode and anode electrodes as from the negative D.C. source indicated at 32, connected through the resistor 34. When the plasma is formed in transducer 30, a constant direct current will pass through resistor 34 as long as the gas (air) pressure in the transducer remains constant. However, the longitudinal acoustic waves reflected from the surface of the test specimen 24 comprises a series of compressions and rarefactions in the air, and when these pass into the transducer 30 they vary the gas pressure therein and hence vary the conducting impedance of the plasma as a function of the gas density. Thus more or less current will flow through the transducer and resistor 34, and the alternating component of this current faithfully represents the variations in the acoustic wave reflected from the workpiece; this component is coupled through capacitor 36 to an amplifier 38. The amplifier receives also a high frequency carrier which will have been frequency-shifted according to the instantaneous velocity of the specimen surface, in accordance with the Doppler principle. A portion of the amplifier output is demodulated as at 40 and applied to peak-reading meter 42, which therefore indicates the carrier level; it will be recalled that the amplitude modulation of the original carrier is a fixed percent of the carrier level as generated.

From amplifier 38, another portion of the received carrier energy is applied to the limiter 44 whose purpose is to remove all amplitude modulation from this portion of the amplified carrier wave. The output of limiter 44 comprises the "velocity modulated" carrier wave (that is, the carrier frequency plus or minus the Doppler frequency), and this wave is coupled to the discriminator 46, which is adjusted to provide zero output at the original transmitted carrier frequency. The discriminator will thus provide as its output a voltage whose amplitude is proportional to the difference between the transmitted and received carrier frequencies, or the Doppler frequency. The output of amplifier 48, energized by this input, is connected to the peak-reading meter 50, which will thus give a continuous indication of the velocity of the test specimen surface being investigated.

Inasmuch as the arrangement applies a fixed and constant value of alternating mechanical force to the surface of the specimen 24, due to the compressional atmospheric wave of ultrasonic frequency projected thereon, any change in the velocity of motion of that region of the surface will appear as a change in the Doppler frequency indicated at meter 50. Meter 42 merely enables the operator to observe that any changes in this reading are not due to a change in the carrier level received. Hence, deviations from the normal indication of meter 50, for a given specimen, may reliably be assumed to be due to a variation in the internal mechanical impedance of the specimen region under test, and in this way a useful indication of strength and integrity of the specimen is obtained without damage to such specimen.

What is claimed is:

1. Apparatus for testing the mechanical impedance of a laminar structure, comprising means for generating a high frequency carrier voltage amplitude modulated by a much lower ultrasonic frequency signal, a gas plasma transducer connected to said generating means for directing against the surface of said structure atmospheric compressional wave energy at the frequency of said carrier modulated by said lower frequency, thereby to introduce vibrational energy at said lower ultrasonic frequency to said surface of said structure, means for altering the frequency of said lower ultrasonic frequency signal through a range including a frequency at which a resonant effect occurs in said structure, means for detecting acoustic energy reflected from said surface, and means coupled to said detecting means for separately measuring the amplitude of the compressional wave reflected from said surface, and the Doppler shift in frequency of the same wave.

2. Apparatus for testing the mechanical impedance of a structure, comprising means for generating a high frequency carrier voltage amplitude modulated by a much lower ultrasonic frequency signal, a transducer connected to said generating means for directing against the surface of said structure atmospheric compressional wave energy at the frequency of said carrier modulated by said lower frequency, thereby to introduce vibrational energy at said lower ultrasonic frequency to said surface of said structure, means for altering the frequency of said lower ultrasonic frequency signal through a range including a frequency at which a resonant effect occurs in said structure, means for detecting acoustic energy reflected from said surface, and means coupled to said detecting means for measuring the amplitude and frequency of the compressional wave reflected from said surface.

3. Apparatus in accordance with claim 2, including means for cyclically varying said lower frequency over a range of frequencies encompassing the resonant frequency of said structure.

4. Apparatus for testing the mechanical impedance of a structure, comprising means for generating a high frequency carrier voltage amplitude modulated by a much lower ultrasonic frequency signal, a transducer connected to said generating means for directing against the surface of said structure atmospheric compressional wave energy at the frequency of said carrier modulated by said lower frequency, thereby to introduce vibrational energy at said lower ultrasonic frequency to said surface of said structure, means for altering the frequency of said lower ultrasonic frequency signal through a range including a frequency at which a resonant effect occurs in said structure, means for detecting acoustic energy reflected from said surface, and means coupled to said detecting means for measuring the Doppler shift in frequency of the received carrier energy, to indicate the velocity of motion of said surface due to ultrasonic energy projected from said transducer.

5. Apparatus for determining the integrity of internal structure of a workpiece in terms of the uniformity of its mechanical impedance comprising; means for deriving a high frequency carrier signal modulated in amplitude by a much lower frequency ultrasonic signal having a frequency variable through a range including a frequency at which a resonant effect occurs in said structure; a gas-plasma transducer coupled to said first-mentioned means and adapted to be spaced from a surface of the workpiece by an intervening quantity of gas thereby to develop atmospheric compressional wave energy in the gas directed toward the surface thereby to introduce vibrational energy at said lower ultrasonic frequency to the surface; transducer means responsive to atmospheric compressional wave energy reflected from the surface for deriving an electrical signal; and means electrically coupled to said transducer means for simultaneously indicating the amplitude and frequency of said electrical signal thereby to indicate the force applied to the surface and to indicate the displacement velocity of the surface of the workpiece.

References Cited in the file of this patent
UNITED STATES PATENTS

| | | |
|---|---|---|
| 2,733,597 | Hardy | Feb. 7, 1956 |
| 2,782,632 | Klein et al. | Feb. 26, 1957 |
| 2,851,876 | Arnold | Sept. 16, 1958 |